Figure 1:
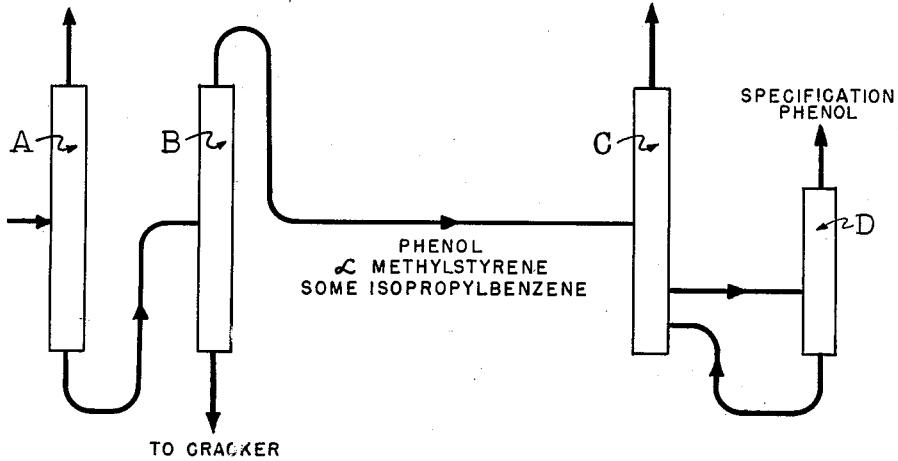

Dec. 27, 1955  G. P. ARMSTRONG ET AL  2,728,795
RECOVERY OF PHENOL

Filed July 17, 1952  4 Sheets-Sheet 1

GODFREY PAUL ARMSTRONG
THOMAS BEWLEY
MAURICE DUDLEY COOKE
INVENTORS

BY  Ernest G. Peterson

AGENT.

GODFREY PAUL ARMSTRONG
THOMAS BEWLEY
MAURICE DUDLEY COOKE
INVENTORS

BY Ernest G. Peterson

AGENT.

Dec. 27, 1955   G. P. ARMSTRONG ET AL   2,728,795
RECOVERY OF PHENOL
Filed July 17, 1952                     4 Sheets-Sheet 4

GODFREY PAUL ARMSTRONG
THOMAS BEWLEY
MAURICE DUDLEY COOKE
INVENTORS

BY Ernest G. Peterson

AGENT.

United States Patent Office 2,728,795
Patented Dec. 27, 1955

2,728,795
RECOVERY OF PHENOL

Godfrey Paul Armstrong, Kingswood, and Thomas Bewley and Maurice Dudley Cooke, Epsom, England, assignors, by mesne assignments, to Hercules Powder Company, a corporation of Delaware Application July 17, 1952, Serial No. 299,465

Claims priority, application Great Britain July 18, 1951

16 Claims. (Cl. 260—621)

The present invention refers to a process for the recovery of phenol and relates in particular to the recovery of phenol in a pure state from reaction mixtures derived from the decomposition of isopropylbenzene hydroperoxide by means of decomposition catalysts. The expression "hydroperoxide" in the following is meant to include the peroxide as well.

It is known that when isopropylbenzene hydroperoxide is decomposed by means of catalytically acting decomposition agents such as acids, for instance, sulphuric acid, phosphoric acid, toluene sulphonic acid and acetic acid, furthermore acid treated earths, hydrogen ion exchange materials, ferric chloride, phosphorous pentachloride, aluminium chloride and similar acidic compounds, besides phenol and acetone which are the main products, acetophenone, alpha-methylstyrene, phenyldimethyl carbinol and cumylphenol are formed as byproducts. When the decomposition reaction is carried out with an oxidation reaction mixture which contains unreacted isopropylbenzene, the resulting reaction mixture contains, in addition, isopropylbenzene. The components of the said decomposition mixture are preferably recovered therefrom by fractional distillation, when as first distillate acetone is recovered. On continuing the distillation any unreacted isopropylbenzene if present in the cleavage mixture together with water and alpha-methylstyrene are distilled over as the next fractions. After complete removal of the monomeric alpha-methylstyrene initially present a mixture of phenol, acetophenone, phenyldimethyl carbinol, cumylphenol and some resinous matter formed by polymerisation of methylstyrene remains in the still. When this mixture is distilled in order to recover therefrom the phenol it is found that, although the distillation is effected under exacting fractionating conditions, the collected distilled phenol fraction is not sufficiently free from impurities to make it fulfil the requirements laid down by the British Standard Specification 523/38 regarding solubility in water, as on dilution with water there results a turbid solution, nor does it fulfil the requirements of the corresponding U. S. P. XIII Specification. Detailed investigations have shown that this turbidity of the solution is due to the presence in the phenol of small amounts of hydrocarbons, mainly alpha-methylstyrene, and that as little as 260 parts per million are sufficient to furnish the objectionable turbidity. As alpha-methylstyrene boils at a considerably lower temperature than phenol and as the alpha-methylstyrene initially present in the decomposition reaction mixture had been completely separated as shown by analysis the presence of further quantities in the final phenol was at first inexplicable.

The present invention is based on the discovery that the further quantities of alpha-methylstyrene found in the phenol after that initially present in the decomposition mixture has been removed completely are formed during the distillation by the dehydration of phenyldimethyl carbinol which is present in the decomposition mixture. The dehydration of the phenyl-dimethyl carbinol takes place only gradually. It is dependent on the temperature to which the phenyldimethyl carbinol is subjected and increases with a rise in the temperature, which as the distillation proceeds at constant pressure will gradually increase. With these higher temperatures, however, the tendency of the alpha-methylstyrene to polymerise also increases. In addition, the use of higher temperatures promotes the condensation of phenol with alpha-methylstyrene and with acetophenone also present in the reaction mixture. All these condensation reactions caused by the application of higher temperatures result in loss of phenol and other valuable compounds. Attempts to catalyse the dehydration of the phenyldimethyl carbinol, for instance by the addition of acid such as sulphuric acid to the still content were not always successful since the acid tends to promote both polymerisation of the alpha-methylstyrene produced and condensation of methylstyrene with phenol to form cumylphenol, with consequent loss of valuable material.

It is an object of the present invention to recover pure phenol from the isopropylbenzene hydroperoxide decomposition mixture. By pure phenol is meant a product which will satisfy either the requirements of the United States Pharmacopoea XIII Specification or British Standard Specification 523/38.

It is another object of the invention to recover from the decomposition mixture monomeric alpha-methylstyrene in as high a yield as possible, as alpha-methylstyrene itself is a valuable material. It may furthermore be hydrogenated to furnish isopropylbenzene which may then be recycled to the oxidation process and thus serve as starting material for the production of additional quantities of isopropylbenzene hydroperoxide whereby the economy of the whole process of phenol production is favoured.

It is an additional object of the invention to obtain the aforementioned results in a very simple manner by which the formation of byproducts and thereby loss of valuable material is minimised.

The process for the recovery of pure phenol by fractional distillation from phenol-containing mixtures derived from the catalytic decomposition of isopropylbenzene hydroperoxide, accordingly comprises removing phenyldimethyl carbinol from said phenol-containing mixture before separating pure phenol by fractional distillation. It is preferred to separate the decomposition mixture from the catalyst and from acetone before the removal of phenyldimethyl carbinol.

The removal of phenyldimethyl carbinol may be effected by fractionally distilling the decomposition mixture in such a manner that a distillate is obtained which comprises phenol and alpha-methylstyrene and isopropylbenzene if this is present in the mixture or by decomposing the phenyldimethyl carbinol in the decomposition mixture.

The requirements regarding the desired purity of the phenol vary in the different countries and accordingly the amounts of phenyldimethyl carbinol which, after removal of the bulk, may be tolerated in the phenol-containing mixture differ. Thus for instance when the production of a British standard specification grade phenol is desired such an amount of phenyldimethyl carbinol is permissible as will result in the production by dehydration during the fractionation of the phenol-containing mixture of not more than 0.04% by weight of alpha-methylstyrene calculated on the amount of phenol. Generally speaking an amount of 0.09% by weight of phenyldimethyl carbinol in the phenol-containing mixture to be fractionated will permit ultimately the recovery of B. S. S. grade phenol and an amount of 0.15% phenyldimethyl carbinol will permit the recovery of a United States Pharmacopoeia grade phenol.

The removal of phenyldimethyl carbinol by subjecting the decomposition mixture to fractional distillation may be effected by carefully adjusting the distillation, the temperatures, the length of the column or columns and the number of plates therein. By carrying out the distillation of the mixture which has preferably been freed previously from the decomposition catalyst and acetone and which comprises alpha-methylstyrene, phenol, phenyldimethyl carbinol, acetophenone and cumylphenol and which may contain also isopropylbenzene in a column with 40 plates and maintaining the ratio of the distillate to the reflux in the proportion of 1:4 a distillate may be obtained which is reduced in its content of phenyldimethyl carbinol to the desired extent and within the limits above indicated.

The fractional distillation by which the removal of phenyldimethyl carbinol from the phenol-containing mixture is achieved may be carried out in one stage in which the hydrocarbons mainly alpha-methylstyrene and isopropylbenzene, if present, are distilled off together with the phenol leaving the phenyldimethyl carbinol in the residue. As an alternative the removal may be effected in two stages, in the first of which the hydrocarbons present are distilled off either separately or together whilst phenol remains substantially completely behind with the phenyldimethyl carbinol and other higher boiling compounds. This distillation may be carried out in the presence or absence of water. The residue is then subjected to a further distillation whereby phenol with some alpha-methylstyrene derived mainly from the decomposition of phenyldimethyl carbinol during the distillation distils over and the remainder of the phenyldimethyl carbinol remains in the still with the other higher boiling substances.

In this way up to about 95% of the phenol initially present in the decomposition mixture may be distilled off leaving in the still residue, besides the bulk of the phenyldimethyl carbinol and other higher boiling compounds, phenol in a quantity at least sufficient to form an azeotropic mixture with the acetophenone also present. This distillation may be carried out at ordinary or reduced pressure.

The phenol thus obtained as distillate contains alpha-methylstyrene and may also contain in some instances isopropylbenzene and other hydrocarbons, but the amount of phenyldimethyl carbinol present is nil or only very small. It is then subjected to fractional distillation whereby the separation of the phenol from the hydrocarbons is achieved to such an extent that the ultimate product will fulfil all the desired requirements regarding purity. As an alternative the distillate may be subjected to distillation in the presence of water which can be adjusted in such a way that only the hydrocarbons with only a small amount of phenol are distilled over whilst phenol remains behind and can be recovered from this residue by a further distillation as distillate in a substantially pure form.

The still residue which contains the remaining part of the phenyldimethyl carbinol originally present in the decomposition mixture, which has not undergone decomposition during the distillation, in addition to other higher boiling decomposition products of the isopropylbenzene hydroperoxide and which contains some phenol may then be subjected to a suitable treatment to dehydrate the phenyldimethyl carbinol to yield alpha-methylstyrene. For example, the residue may be heated to a temperature in excess of 180° C., and preferably within the range from 250 to 300° C. Since however p-cumyl phenol and other compounds are also present in the still residue and these may be decomposed with the formation of phenol, isopropylbenzene and alpha-methylstyrene when heated at temperatures which are higher than those which will effect the dehydration of phenyl dimethyl carbinol, it is preferred to heat the still residue at a temperature between 250 and 400° C. by which treatment phenyldimethyl carbinol, p-cumyl phenol and other constituents are decomposed and additional amounts of isopropylbenzene, methylstyrene and phenol are obtained. The dehydration of the phenyldimethyl carbinol and the decomposition of p-cumyl phenol and other constituents may be improved if a small amount of acid for instance 0.1% of sulphuric acid is present in the heating zone. When the residue has been thus treated there are produced isopropylbenzene, alpha-methylstyrene, water and some phenol all of which may be recovered as desired. For instance the alpha-methylstyrene may be recovered by distillation and the phenol, which forms with the acetophenone present an azeotropic mixture, by extraction, for instance with aqueous sodium hydroxide solution, for instance by the method disclosed in copending application Ser. No. 306,825, filed August 28, 1952. From the aqueous phenol solution the phenol may be liberated in the well known manner for instance by acidification.

The further method of removing phenyldimethyl carbinol from the phenol-containing mixture according to the present invention already referred to comprises subjecting the decomposition mixture preferably after previous removal of the decomposition catalyst and of the acetone to a heat treatment at temperatures sufficiently high to produce substantially complete dehydration of the phenyldimethyl carbinol. The duration of the heat treatment should not be so long, however, as to polymerise to any large extent any methylstyrene present in the mixture. In order to minimise the polymerisation of alpha-methylstyrene it is preferred however to distil off the alpha-methylstyrene from the decomposition mixture before it is subjected to the heat treatment, especially if this is carried out at the higher range of temperature referred to above. Any isopropylbenzene present may also be removed from the mixture before it is subjected to the heat treatment. Such a heat treatment may be carried out by a flash distillation at a temperature or for instance 300° C. when the mixture is exposed to high temperatures for a very few seconds only. Another way of achieving the dehydration satisfactorily is to introduce the mixture containing phenyldimethyl carbinol into a column, the lower part of which is heated to the dehydration temperature, for instance at 300 to 350° C. As an alternative method, the mixture may be heated for a longer time at a lower temperature for instance at 200° C. This latter procedure may be applied with advantage when the process of the invention is carried out batchwise.

For this purpose the decomposition mixture is charged into a properly insulated vessel in which it is heated up to the desired temperature and kept therein for a considerable time after which the mixture is subjected to fractional distillation.

Preferably the alpha-methylstyrene is removed from the mixture as it is formed to avoid polymerisation.

The heat treatment may also be carried out at temperatures exceeding 300°, and preferably bewteen 300 and 400° C. whereby the p-cumylphenol present is cracked at the same time into alpha-methylstyrene and phenol. The phenol contained in the resulting mixture may then be separated readily from the alpha-methylstyrene by fractional distillation and may be recovered in a pure state and substantially free from hydrocarbons. Additionally the mixture undergoing heat treatment may be put under reduced pressure to facilitate removal of the alpha-methylstyrene.

Figure 4:
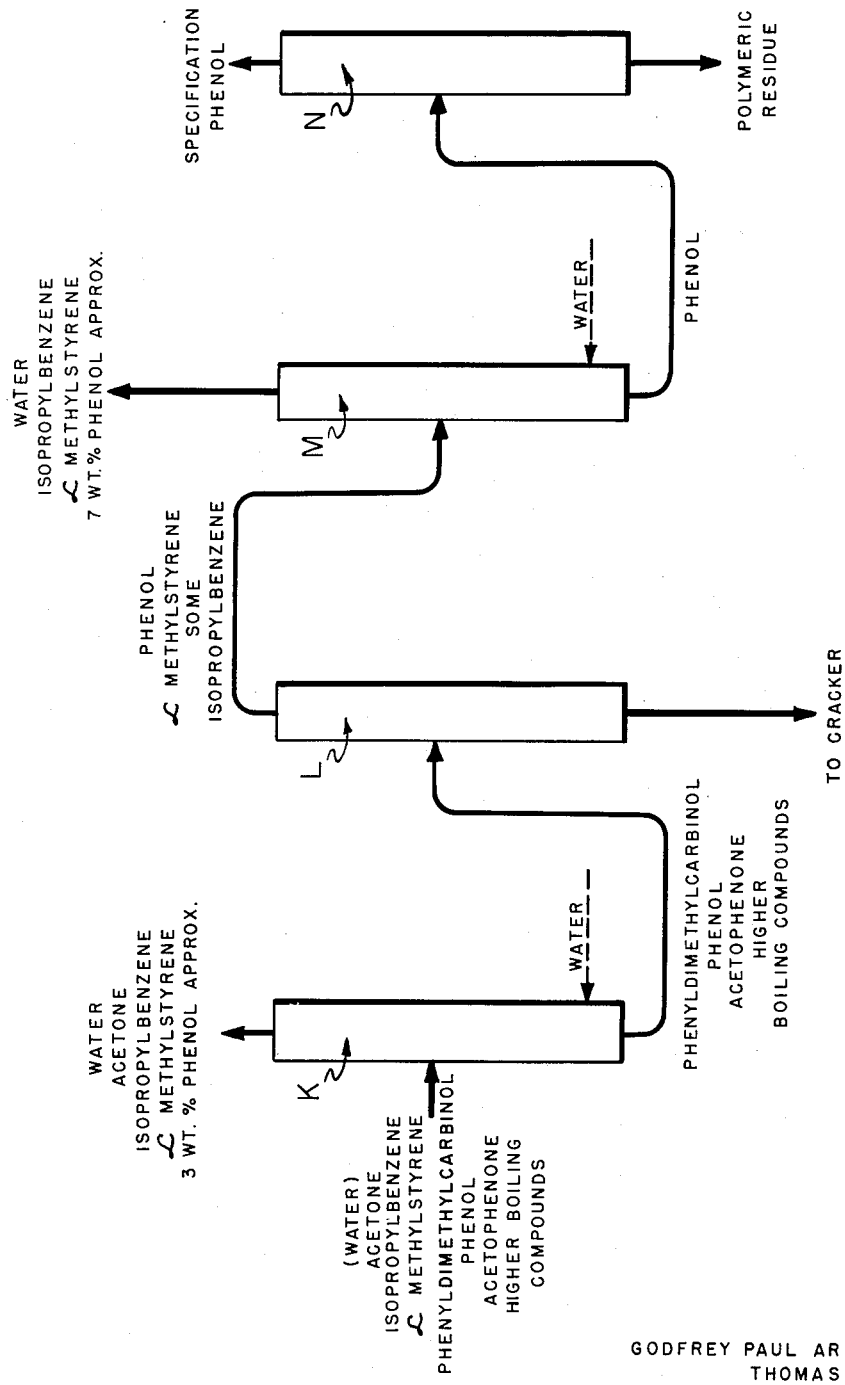
Figure 5:
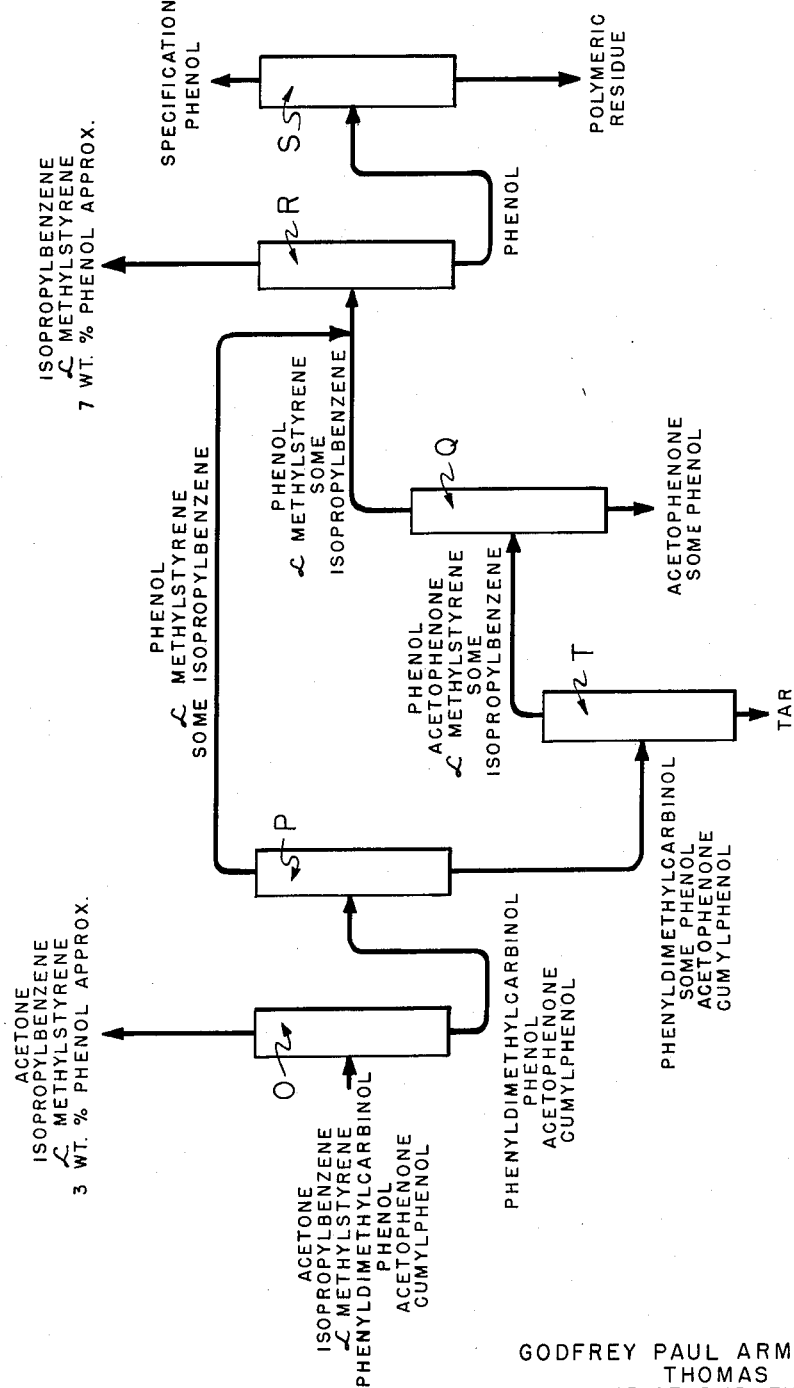

The following examples with the attached diagrammatic drawings illustrate the manner in which the process of the invention may be carried out in practice. The parts indicated are parts by weight. The procedures of the examples are illustrated in Figures 1, 2, 3 and 5. Figure 5 corresponds substantially to Figure 1 but is a more detailed version thereof, particularly in showing cracker T and column Q and combination of the phenol, α-methylstyrene and some isopropylbenzene from the cracking operation with the overhead from column P and introduction of the combined material into column R. Also, a modification of the procedure shown in Figure 1 is given in Figure 4. The latter procedure differs from that illustrated in Figure 1 in that in column K the acetone, as well as isopropylbenzene and α-methylstyrene, is removed and that water is introduced during the distillation. Also Figure 4 shows the modification of introducing water into column M during distillation of the phenol fraction from column L to remove hydrocarbons.

*Example 1*

A mixture obtained by the decomposition of isopropylbenzene hydroperoxide by means of acid contained acetone, water, isopropylbenzene, alpha-methylstyrene, phenol, acetophenone, phenyldimethyl carbinol and some higher boiling compounds. It was distilled to remove acetone and the residue contained 923 parts of phenol and 37 parts of carbinol. This mixture was fed into a continuous distillation column, shown in Figure 1 of the accompanying diagrammatic drawings as column A. The feed entered at a point approximately one third of the way up the column which contained 40 plates and was operated with a ratio of reflux to distillate of 5:1 and at a pressure of 200 mm. Hg. absolute at the top of the column. The distillate contained most of the isopropylbenzene, some methylstyrene and a little phenol whcih was recovered by extraction with alkali. The mixture leaving the bottom of column A was fed into a continuous distillation column shown in Figure 1 as B, containing 45 plates and operated at a ratio of reflux to distillate of 4:1 and a pressure of 100 mm. Hg. at the top of the column. The mixture was fed in 8 plates up from the base of the column. The distillate contained 800 parts of phenol and only 0.8 part of carbinol, besides alpha-methylstyrene, isopropylbenzene and traces of acetophenone and a little water. It was fed into the final distillation column C which contained 50 plates and operated with a stripping ratio of 0.85:1 and a pressure of 200 mm. Hg at the top of the column. The mixture leaving the bottom of column B contained some phenol, practically all the acetophenone, some residual carbinol and higher boiling materials. This was pumped to a pyrolysing device, not shown, maintained at a temperature of about 325° C., which was sufficient both to decompose the carbinol to alpha-methylstyrene and the cumylphenol to alpha methylstyrene, isopropylbenzene and phenol. The mixture from this pyrolyser was fractionated and the distillate consisting mainly of phenol with some alpha-methylstyrene and isopropylbenzene was combined with that from column B and fed jointly into column C. The combined feed contained 915 parts of phenol and 0.8 part of carbinol. The distillate from column C consisted mainly of isopropylbenzene and alpha-methylstyrene with a little phenol, which was recovered by caustic alkali extraction. From 2 plates up from the base of the column C, phenol vapour was removed and passed through a small side column D of 5 plates, operated with the low ratio of reflux to distillate of 0.25:1. The overhead vapour from column D, upon condensation, gace 890 parts of pure phenol, fulfilling in every way the requirements of the British and United States standard specifications, while polymeric products formed during the distillation are obtained as residue.

*Example 2*

A decomposition mixture was treated by passing through columns A and B, as described in Example 1. The resulting product withdrawn from the top of column B as distillate and containing 1715 parts of phenol with some isopropylbenzene, alpha-methylstyrene and traces of higher boiling hydrocarbons was charged with 300 parts of water into a batch distillation vessel replacing column C in Figure 1. This still was fitted with a 6 ft. x 1¼ inch packed fractionating column through which first the hydrocarbons were distilled over as azeotropes with water whilst the aqueous phenol was returned to the still. In this way 170 parts hydrocarbons were removed from the phenol. Subsequently, as a second fraction, phenol-water-azeotrope was distilled over and, finally, pure anhydrous phenol was taken off. In this manner over 95% of the phenol was recovered in a British standard specification grade. The phenol-water-azeotrope may be reintroduced into the batch distillation vessel in place of the water charged.

*Example 3*

Figure 2:
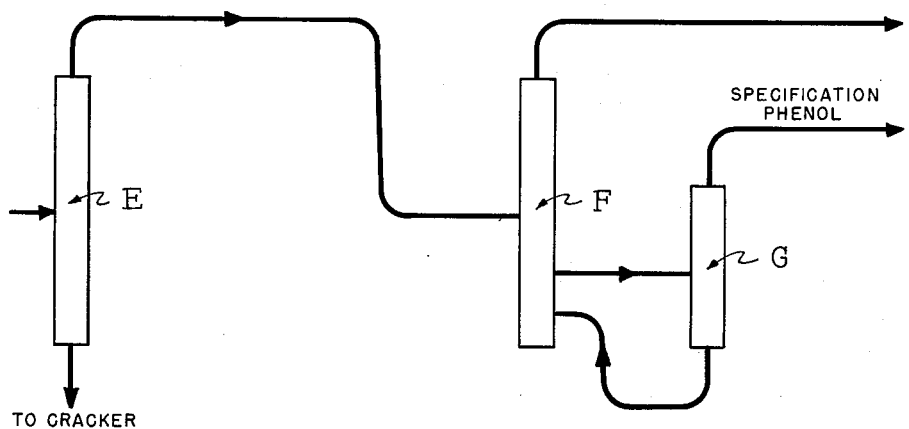
Figure 3:
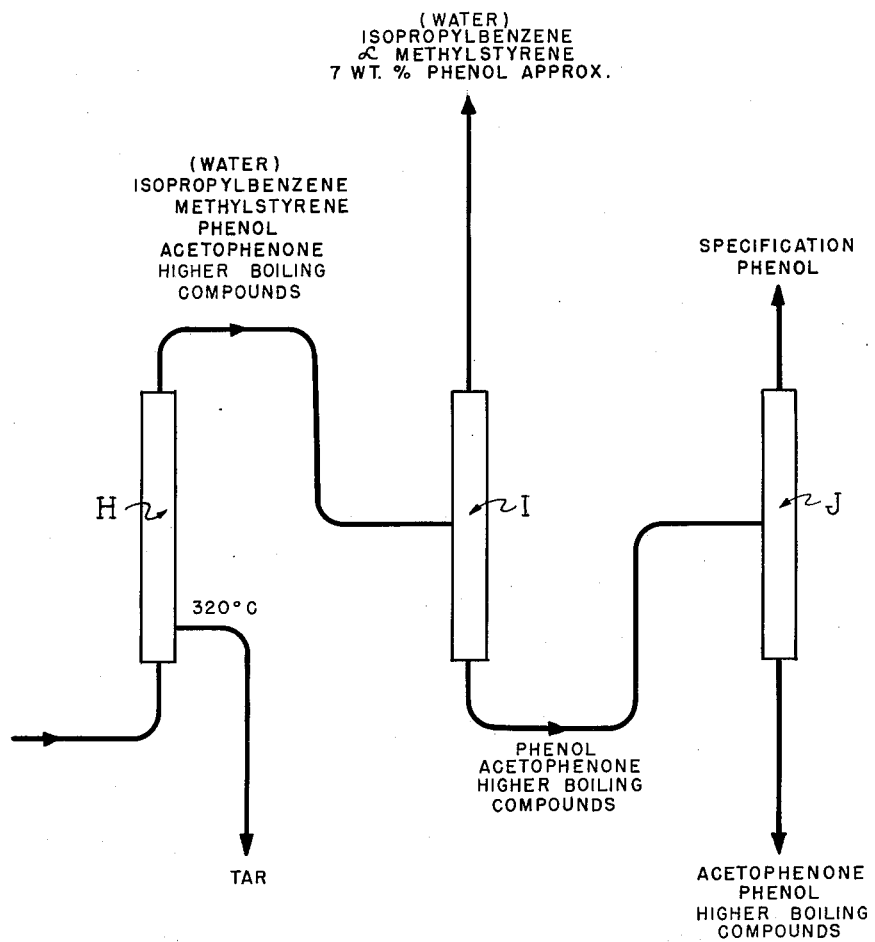

The operation of this example is illustrated in Figure 2. A mixture obtained by the decomposition of isopropylbenzene hydroperoxide was first distilled in order to remove acetone. The acetone-free material was introduced to the continuous distillation still E, operating under pressure of 60 mm. Hg absolute at the top of the column. A reflux ratio of 4:1 was used and the column contained 40 plates. The purpose of this still being to separate phenyldimethyl carbinol from the phenol, it was adjusted in such a way that substantially no phenyldimethyl carbinol distilled over. The bulk of the phenol, that is from 70 to 90% of the phenol in the feed, with the lower boiling materials, water and hydrocarbons, were removed in the distillate which was fed to the continuous distillation column F which was provided with a small side column G and was operated under similar conditions to those given for columns C and D of Figure 1. From the top of column G phenol substantially free from hydrocarbons and higher boiling impurities and satisfying the standard specifications was recovered.

The residues from the still E containing phenol, carbinol, acetophenone and high molecular weight compounds was passed through a cracking device maintained at a temperature of about 300° C. which decomposed both carbinol and cumylphenol. Further quantities of phenol were recovered from the mixture leaving the cracker in a manner similar to that described in Example 1.

*Example 4*

A decomposition mixture from which catalyst and acetone had been removed contained besides isopropylbenzene, alpha-methylstyrene, acetophenone, and higher boiling compounds, 2774 parts of phenol and 138 parts of phenyldimethyl carbinol. This mixture was fed to the base of column H in Figure 3, which contained liquid residues from previous operations maintained at 320° C. The distillate from column H was free from phenyldimethyl carbinol and consisted of water, isopropylbenzene, alpha-methylstyrene, phenol, acetophenone and a small amount of higher boiling compounds. This was fed to column I where substantially all the water, isoproylbenzene and alpha-methylstyrene was removed as a distillate with a small amount of phenol. The bottom product, containing most of the phenol, acetophenone and a small amount of high boiling compounds, was fed to column J, where 2679 parts of phenol was obtained as distillate satisfying the standard specification.

We claim:

1. The process for the recovery of pure phenol by fractional distillation from a mixture derived from the catalytic decomposition of isopropylbenzene hydroperoxide, said mixture containing acetone, isopropylbenzene, α-methylstyrene, phenol, phenyldimethyl carbinol, acetophenone and cumylphenol, which comprises fractionally distilling said mixture to obtain (1) a phenol fraction containing not more than about 0.15% phenyldimethyl carbinol and (2) a residue containing phenyldimethyl carbinol and cumylphenol, and then subjecting the phenol fraction (1) to fractional distillation to separate pure phenol.

2. The process of claim 1 wherein the residue containing phenyldimethyl carbinol and cumylphenol is subjected to a heat treatment wherein the phenyldimethyl carbinol is dehydrated and the cumylphenol is decomposed, and the mixture resulting from the heat treatment and containing phenol, α-methylstyrene and isopropylbenzene is fractionally distilled to recover additional quantities of phenol, isopropylbenzene and α-methylstyrene.

3. The process of claim 1 wherein the fractional distillation of the phenol fraction (1) to separate pure phenol is arranged so that the pure phenol is recovered as the distillate, and polymeric products formed during the distillation remain as residue.

4. The process of claim 1 wherein acetone is removed from the decomposer mixture prior to the step of fractionally distilling the mixture to obtain the phenol fraction (1).

5. The process of claim 4 wherein, after the acetone has been removed, the decomposer mixture is subjected to fractional distillation to remove a fraction containing isopropylbenzene and α-methylstyrene prior to the step of fractionally distilling the mixture to obtain the phenol fraction (1).

6. The process of claim 5 wherein the fractional distillation to remove a fraction containing isopropylbenzene and α-methylstyrene is carried out in the presence of water.

7. The process for the recovery of pure phenol by fractional distillation from a mixture derived from the catalytic decomposition of isopropylbenzene hydroperoxide, said mixture containing acetone, isopropylbenzene, α-methylstyrene, phenol, phenyldimethyl carbinol, acetophenone and cumylphenol, which comprises fractionally distilling said mixture to obtain, in the following order: (1) an acetone fraction; (2) a fraction containing primarily isopropylbenzene and α-methylstyrene; and (3) a phenol fraction containing not more than about 0.15% phenyldimethyl carbinol; and (4) a residue containing phenyldimethyl carbinol and cumylphenol, and then subjecting the phenol fraction (3) to fractional distillation to separate pure phenol.

8. The process of claim 7 wherein any α-methylstyrene formed by dehydration of any phenyldimethyl carbinol present during distillation of the phenol fraction (3) is collected as a separate fraction.

9. The process of claim 8 wherein the distillation of the phenol fraction (3) is effected in two stages, in the first of which α-methylstyrene is removed as distillate and in the second of which pure phenol is recovered as distillate.

10. The process of claim 9 wherein the first of the two stages is carried out in the presence of water.

11. The process for the recovery of pure phenol by fractional distillation from a mixture derived from the catalytic decomposition of isopropylbenzene hydroperoxide, said mixture containing acetone, isopropylbenzene, α-methylstyrene, phenol, phenyldimethyl carbinol, acetophenone and cumylphenol, which comprises fractionally distilling said mixture to obtain, in the following order: (1) an acetone fraction and (2) a phenol fraction containing isopropylbenzene and α-methylstyrene and not more than about 0.15% phenyldimethyl carbinol, and (3) a residue containing phenyldimethyl carbinol and cumylphenol, and then subjecting the phenol fraction (2) to fractional distillation to separate pure phenol.

12. The process of claim 11 wherein the distillation of the phenol fraction (2) is effected in two stages, the first of which is carried out in the presence of water, resulting in the removal of isopropylbenzene and α-methylstyrene as distillate, and in the second of which pure phenol is recovered as distillate.

13. The process for the recovery of pure phenol by fractional distillation from a mixture derived from the catalytic decomposition of isopropylbenzene hydroperoxide, said mixture containing acetone, isopropylbenzene, α-methylstyrene, phenol, phenyldimethyl carbinol, acetophenone and cumylphenol, which comprises fractionally distilling said mixture to obtain (1) a phenol fraction containing not more than about 0.15% phenyldimethyl carbinol and (2) a residue containing phenyldimethyl carbinol and cumylphenol, subjecting said residue to heat treatment at a temperature between 180° and 400° C., combining the volatiles from said heat treatment with the phenol fraction (1), and subjecting the combined material to fractional distillation to separate pure phenol.

14. The process for the recovery of pure phenol by fractional distillation from a mixture derived from the catalytic decomposition of isopropylbenzene hydroperoxide, said mixture containing acetone, isopropylbenzene, α-methylstyrene, phenol, phenyldimethyl carbinol, acetophenone and cumylphenol, which comprises fractionally distilling said mixture to obtain (1) a phenol fraction containing α-methylstyrene and not more than about 0.15% phenyldimethyl carbinol, (2) a residue containing phenyldimethyl carbinol and cumylphenol, subjecting said residue to heat treatment at a temperature between 180° and 400° C., recovering from said heat treatment a mixture containing α-methylstyrene and phenol, combining said mixture containing α-methylstyrene and phenol with the phenol fraction (1) containing α-methylstyrene and phenol, and subjecting the combined material to fractional distillation to separate pure phenol.

15. The process of claim 14 wherein the fractional distillation of the combined material containing α-methylstyrene and phenol is effected in two stages, in the first of which α-methylstyrene is removed as distillate and in the second of which pure phenol is recovered as distillate.

16. The process of claim 15 wherein the first of the two stages is carried out in the presence of water.

References Cited in the file of this patent
UNITED STATES PATENTS 2,345,625     Palmer et al.     Apr. 4, 1944

FOREIGN PATENTS 670,444     Great Britain     Apr. 16, 1952